3,525,448
PIVOTAL JOINT WITH BALL-BUSHING AND
COUNTERSUNK PIN
James J. Bauer, Lisbon, N. Dak., assignor, by mesne assignments, to Clark Equipment Company, Buchanan, Mich., a corporation of Delaware
Filed May 17, 1968, Ser. No. 730,044
Int. Cl. B66f 9/00
U.S. Cl. 214—778     2 Claims

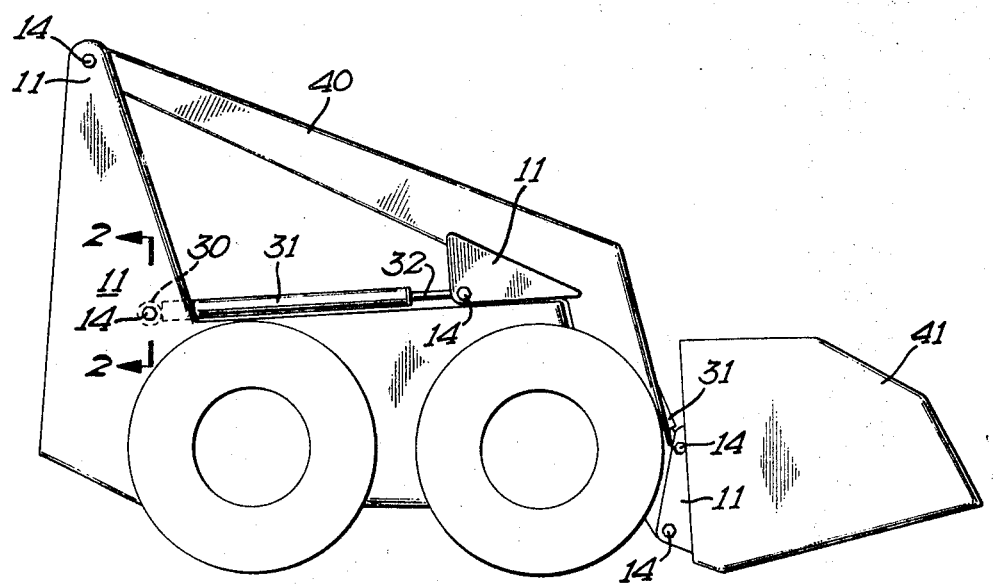
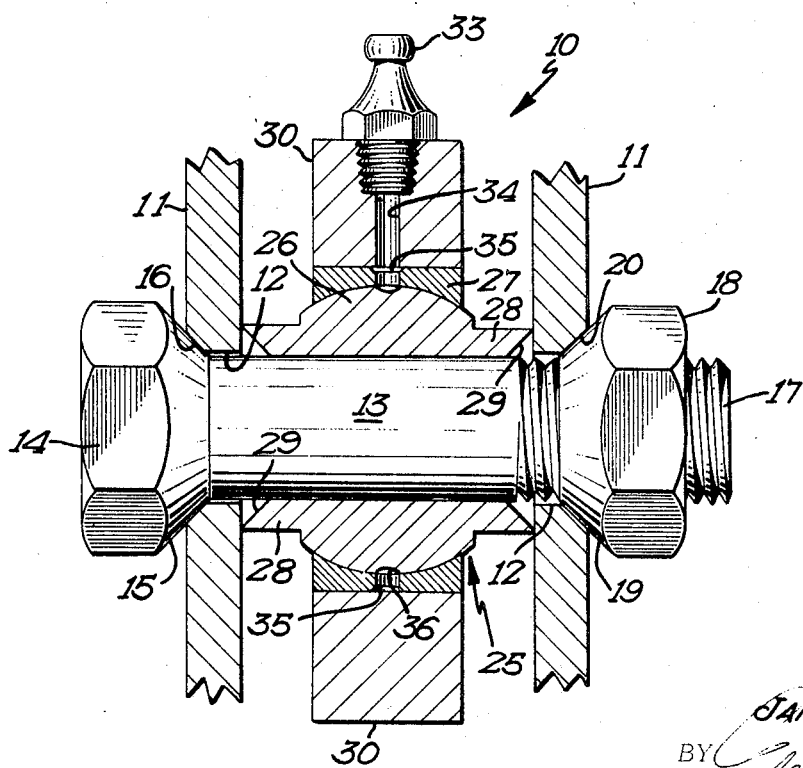

ABSTRACT OF THE DISCLOSURE

A pivotal, heavy-duty joint characterized by a countersunk pin having a ball-bushing axially mounted thereto. The beveled head and nut of the pin respectively engage the exterior surface of a pair of parallel spaced side plates and provide a means for compensating for wear between the pin and the side plates. The ball-bushing is spaced inwardly from the side plates by collar means. A force transmitting member is mounted to the ball-bushing to transmit force in a direction transverse to the axis of the pin and parallel to the side plates. The countersink provides a means for compensating for wear between the pin and the side plates. The ball-bushing compensates for any misalignment between the force transmitting member and the pin.

BACKGROUND OF THE INVENTION

The invention relates to the field of heavy-duty pivotal joints, particularly those which must serve under heavy loading in a contaminated environment. While there are many situations in which performance under the foregoing conditions is called for, the invention is particularly useful as a joint in close proximity to an earth moving implement mounted to a prime mover. In earth moving, high forces must be applied at joints which at times may be submerged in dirt. Nevertheless the joint must pivot freely to insure proper manipulation of the earth engaging member, such as the bucket on a front-end loader. Such an environment is hostile to smooth operation and long life since the dirt tends to contaminate the joint creating abrasion therein. The present invention is intended for use in this field and performs very well under the conditions described.

Countersinking the head and nut of the pin of a pivotal joint in the side plates, for the purpose of compensating for wear between the pin and the side plates, is not new. Such a principle is disclosed in the patent to Tewsley, 1,667,610, issued on Apr. 24, 1928. Although, as exemplified by the Tewsley reference, the principle of countersinking to compensate for wear is not new, the prior art has failed to provide any means at the joint for compensating for misalignment. Moreover, in the prior art, tightening of the countersunk head and nut has generally tended to draw the side plates together, against the force transmitting member disposed between the side plates, to thereby restrict smooth pivotal movement thereof. The prior art has also failed to provide adequate means for lubricating the joint and has not provided the ease of manufacture and assembly which is provided by the present invention.

SUMMARY OF INVENTION

The present invention is characterized by a ball-bushing in combination with a countersunk pin. More particularly, the invention includes a pair of parallel spaced side plates, a pin extending transversely through the side plates, a head on the pin having a beveled surface engaging one of the side plates at its exterior surface, an axially adjustable beveled member on the opposite end of the pin with the beveled surface engaging the other side plate at its exterior surface, a ball-bushing axially mounted on the pin between the side plates, and a force transmitting member secured to the ball-bushing. Spacing between the side plates and the ball-bushing is maintained by collar means. A grease bore and channels are provided in the ball-bushing to provide for thorough lubrication of the joint.

The primary object of the invention is to provide a heavy-duty pivotal joint which will function well under heavy loading conditions in a contaminated environment.

It is also an object to provide a joint having high performance characteristics under the above conditions in which means is provided for compensating for wear which may occur between the pin and the side plates and in which means is provided to compensate for misalignment.

Another object is to provide a heavy-duty pivotal joint having an increased ease of manufacture and assembly.

Another object is to provide a heavy-duty pivotal joint including means for compensating for wear between the pin and side plates, and means for compensating for misalignment, wherein means is also provided for spacing the means for compensating for misalignment from the side plates, to thereby insure smooth operation.

And finally, it is also an object to provide a joint of the type described above wherein means is provided to thoroughly lubricate the joint.

DESCRIPTION OF DRAWINGS

FIG. 1 is a side view of a vehicle in which the heavy-duty pivotal joint of the present invention may be used. The head of the pin which serves as a component in the joint is shown at various points on the vehicle.

FIG. 2 is an axial sectional view of the joint which comprises the invention. The sectional view is taken on the pin axis and on the axis of the radial grease bore and shows the side plates, countersunk pin, ball-bushing, grease bores and channels, and the force transmitting member.

DESCRIPTION OF PREFERRED EMBODIMENT

The joint which comprises the present invention may be readily understood with reference first to FIG. 2. The joint 10 includes a pair of side plates 11, each provided with an opening 12. A pin 13 extends transversely through openings 12 of side plates 11. Openings 12 are bored oversize to provide substantial tolerance between pin 13 and plates 11, as shown in FIG. 2. A beveled or countersunk head 14 is formed integrally with pin 13. The beveled or countersunk surface 15 of head 14 engages the exterior surface of one side plate 11. Side plate 11 may be provided with a beveled surface 16 for engagement with beveled surface 15 of head 14.

The opposite end of pin 13 is threaded as shown at 17 and a nut 18 mates with threads 17. Nut 18 is provided with a beveled or countersunk surface 19 which engages the exterior surface of the opposite side plate 11. The exterior surface of the side plate 11 may be beveled or countersunk, as at 20, for engagement with beveled surface 19 of nut 18.

It should be recognized that side plates 11 may be provided without any beveled or countersunk surface such as is shown at 16 and 20. Instead a countersunk surface may be subsequently created by the tightening of nut 18 to thereby draw head 14, as well as nut 18, into tight engagement with the exterior surface of side plates 11. Due to the beveled or countersunk surface 16 or 18, respectively, on head 14 and nut 18, a beveled or countersunk surface results at the exterior surface side plates 11 by natural wear.

Openings 12 in side plates 11 are greater in diameter than the diameter of pin 13. Thus, there is substantial tolerance between pin 13 and openings 12 of side plates 11. The tolerance provides for ease of manufacture and assembly in that precision sizing and alignment of the openings 12 in side plates 11 is not required since pin 13 is self-centering in openings 12.

A ball-bushing 25 is axially mounted on pin 13. Ball-bushing 25 includes an inner ball member 26 and an outer socket member 27. Inner ball member 26 is also provided with integrally formed collars 28 on opposite sides thereof. Collars 28 serve to space the inner ball member 26 and the mating outer socket 27 inwardly from side plates 11, as clearly shown in FIG. 2. Collars 27 also serve to fix inner ball member 26 with respect to side plates 11 and for that purpose an internal bevel 29 is provided on the outer edge of collar 28. The internally beveled edge 29 bites into the inside surface of side plates 11 to thereby prevent movement between side plate 11 and internal ball member 26. Internal ball member 26 is also not free to rotate on pin 13. Socket member 27 is free, however, to rotate about the axis of pin 13 on inner ball member 27 and is also free to rotate about an axis perpendicular to the axis of pin 13. Thus movement in joint 10 occurs at the interface between inner ball member 26 and outer socket member 27, and at no other place.

A force transmitting member 30 is mounted to outer socket member 27. Force transmitting member 30 in turn is connected to a means for producing force such as the cylinder 31 or connecting rod 32 shown in FIG. 1.

With reference again to FIG. 2, force transmitting member 30 is provided with a grease fitting 33, threaded thereto, which communicates with radial grease bore 34. Grease bore 34 extends radially through force transmitting member 30 and outer socket member 27. Grease bore 34 also extends through outer socket member 27 on the opposite side of pin 13, but not through inner ball member 26 since internal ball member 26 does not rotate on pin 13. A grease channel 35 extends circumferentially around the outer face of outer socket member 27. A similar grease channel 36 extends circumferentially around the outer surface of inner ball member 27.

The environment in which pivotal joint 10 is particularly advantageously used is exemplified by FIG. 1. The joint 10 may be used at a number of points shown in FIG. 1 where head 14 may be seen. When used in the environment shown, the pivotal joint serves as a connection between the loader arms 40, the bucket 41, the hydraulic cylinders 31, and the vehicle body. Hydraulic cylinders 31 serve to pivot the loader arms 40 and bucket 41. As hydraulic cylinders 31 are extended and retracted, pivotal movement occurs at each of the joints represented by head 14 in FIG. 1, in a manner which is deemed obvious, requiring no further description of the operation of the loader vehicle shown.

The inventive features in the use or operation of pivotal joint 10 may be readily appreciated with reference to FIG. 1. A substantial amount of force is required to raise loader arms 40 when bucket 41 is full. Under such heavy-duty, operating conditions, there is a tendency, in ordinary construction, for wear to occur between pin 13 and side plates 11. With the present invention, however, no such wear is permitted since nut 18 is tightened upon pin 13 to thereby draw beveled surfaces 15 and 19 of head 14 and nut 18, respectively, into tight engagement with side plates 11. If, under extreme loading, wear or deformation takes place, tightening of nut 18, compensates for such play or wear which may have resulted due to the loading of joint 10.

During tightening of nut 18, collar portions 28 prevent side plates 11 from being drawn together into engagement with outer socket member 27 and force transmitting member 30. Thus, as nut 18 is tightened to firmly engage the side plates, there is no tendency to restrict movement of outer socket member 27 or force transmitting member 30.

Ball-bushing 25 provides an interface for pivotal movement about the axis of pin 13. It also serves to provide means for compensating for misalignment between the axis of cylinder 31 and connecting rod 32 and pin 13. Misalignment is represented by the lack of a perpendicular relationship between the axis of connecting rod 32 and the axis of pin 13. If such misalignment occurs, outer socket member 27 is free to pivot about an axis perpendicular to the axis of pin 13 to thereby compensate therefor.

While each of the joints shown in FIG. 1 at head 14 may be subjected to a contaminated environment, the joint at the connection between the loader arm 40 and bucket 41, shown in the lower right hand portion of FIG. 1, is particularly so subjected. This joint is almost constantly submerged in or exposed to abrasive matter such as dirt, sand and other abrasive material being handled. It is, consequently, particularly susceptible to abrasive forces created by the entry into the joint of the substance being handled. The interface between inner ball member 26 and outer socket member 27, experience with the present invention has shown, is significantly resistant to contamination. Moreover, grease fitting 33, grease bore 34, and grease channels 35 and 36 provide means for lubricating the interface between inner ball member 26 and outer socket member 27 to bring about substantial resistance to contamination.

The foregoing represents the preferred embodiment of the present invention. Changes may be made in the form shown without departing from the scope of the invention. More particularly, various means may be provided for mounting head 18 on pin 13 for axial adjustment with respect thereto. While threads 17 are shown for that purpose, other means may also be used. In addition, grease channels 35 and 36 could be provided on the inside surfaces of force transmitting member 30 and outer socket member 27, respectively, since grease channels so disposed would function in the same way as channels 35 and 36 shown in FIG. 2. It should also be recognized that the joint 10 may be used in a number of environments, the environment shown in FIG. 1 being merely illustrative of one field of use of the invention.

Having thus described the invention, the following is claimed:

1. In a self-propelled loader having loader arms and a bucket actuated by extensible and retractable force transmitting means mounted between points on the loader arms and the bucket, respectively, pivotal joints disposed at at least one of said points comprising:

a pair of relatively fixed, substantially parallel, spaced side plates having aligned holes formed therein;

a pin extending through both of said aligned holes in the side plates with the outer diameter of the pin being less than the diameter of said aligned holes formed in the side plates;

a head formed on one end of the pin, the head having a beveled surface engaging the exterior surface of one of the side plates about said hole formed in the one side plate;

an axially adjustable member mounted on the opposite end of the pin, the member having a beveled surface engaging the exterior surface of the other side plate about said hole formed in the other side plate;

a ball-bushing axially mounted on the pin between the side plates, the ball-bushing including an inner ball member and an outer annular socket member, the outer surface of the ball member and the inner socket member being mating spherical cooperating surfaces;
a force transmitting member secured to the socket member and adapted to transmit force in a direction transverse to the central longitudinal axis of the pin, the force transmitting member and the socket member defining a bore which extends radially with respect to the ball member;
a pair of collar members axially extending respectively from the opposite sides of the ball member and contacting the interior surfaces of the side plates, each collar member having a bevel portion extending from outer peripheral surface to the inner peripheral surface thereof; and
a grease fitting communicating with said bore so that grease can be introduced between the force transmitting member and the socket member and between the socket member and the ball member.

2. The self-propelled loader of claim 1 wherein said holes formed in the side plates are countersunk for mating engaged with the beveled surfaces on the head and the axially adjusted member; wherein the collars are integrally formed with the ball member; and wherein a channel is formed circumferentially about the exterior surface of the ball member and communicates with said bore.

References Cited

UNITED STATES PATENTS

| | | |
|---|---|---|
| 841,395 | 1/1907 | Hewitt. |
| 987,853 | 3/1911 | Bryan _____ 308—64 XR |
| 1,153,986 | 9/1915 | Whitney _____ 287—100 |
| 1,296,778 | 3/1919 | Delling _____ 308—64 XR |
| 2,919,942 | 1/1960 | Bechtel _____ 287—96 |
| 3,107,954 | 10/1963 | Rudy _____ 287—96 XR |
| 3,218,740 | 11/1965 | White _____ 37—117.5 |
| 3,379,464 | 4/1968 | Bradshaw. |

FOREIGN PATENTS

| | | |
|---|---|---|
| 662,493 | 7/1938 | Germany. |
| 791,555 | 3/1958 | Great Britain. |

DAVID J. WILLIAMOWSKY, Primary Examiner

A. V. KUNDRAT, Assistant Examiner

U.S. Cl. X.R.

287—88, 100